US008855368B2

(12) United States Patent
Tanase et al.

(10) Patent No.: US 8,855,368 B2
(45) Date of Patent: *Oct. 7, 2014

(54) IMAGE IDENTIFICATION DEVICE, IMAGE IDENTIFICATION METHOD, AND RECORDING MEDIUM

(75) Inventors: Yasushi Tanase, Nerima-ku (JP);
Takeshi Miura, Bunkyo-ku (JP);
Yasuhiro Todoroki, Musashino (JP);
Toshiki Shiino, Bunkyo-ku (JP);
Kensuke Habuka, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 333 days.

This patent is subject to a terminal disclaimer.

(21) Appl. No.: 13/477,612

(22) Filed: May 22, 2012

(65) Prior Publication Data
US 2012/0300982 A1 Nov. 29, 2012

(30) Foreign Application Priority Data

May 23, 2011 (JP) ................................. 2011-114660

(51) Int. Cl.
G06K 9/00 (2006.01)
G06K 9/46 (2006.01)

(52) U.S. Cl.
CPC .......... *G06K 9/4642* (2013.01); *G06K 9/00684* (2013.01)
USPC ....................................................... 382/103

(58) Field of Classification Search
None
See application file for complete search history.

(56) References Cited

U.S. PATENT DOCUMENTS

| 7,860,320 | B2 * | 12/2010 | Luo et al. ....................... 382/227 |
| 8,600,162 | B2 * | 12/2013 | Tanase et al. ................. 382/181 |
| 2001/0012019 | A1 * | 8/2001 | Yamazaki et al. ............. 345/639 |
| 2002/0122596 | A1 * | 9/2002 | Bradshaw ...................... 382/226 |
| 2005/0129311 | A1 * | 6/2005 | Haynes et al. ................. 382/170 |
| 2007/0165950 | A1 * | 7/2007 | Nishida .......................... 382/177 |

(Continued)

FOREIGN PATENT DOCUMENTS

CN 101630405 A 1/2010
CN 101650783 A 2/2010

(Continued)

OTHER PUBLICATIONS

Vailaya, Aditya, Anil Jain, and Hong Jiang Zhang. "On image classification: city vs. landscape." Content-Based Access of Image and Video Libraries, 1998. Proceedings. IEEE Workshop on. IEEE, 1998.*

(Continued)

Primary Examiner — Tahmina Ansari
(74) Attorney, Agent, or Firm — Sughrue Mion, PLLC

(57) ABSTRACT

The invention provides an image identification device that classifies block images obtained by dividing a target image into predetermined categories, using a separating plane learning of which has been completed in advance for each of the categories. The image identification device includes a target image input unit inputs the target image, a block image generation unit divides the target image into blocks to generate the block images, a feature quantity computing unit computes feature quantities of the block images, and a category determination unit determines whether the block images are classified into one of the categories or not, using the separating plane and coordinate positions corresponding to magnitudes of feature quantities of the block images in a feature quantity space, wherein the feature quantity computing unit uses, as a feature quantity of a given target block image, local feature quantities and a global feature quantity.

12 Claims, 14 Drawing Sheets

(56) References Cited

U.S. PATENT DOCUMENTS

| | | | |
|---|---|---|---|
| 2008/0279460 A1* | 11/2008 | Kasahara et al. | 382/224 |
| 2012/0300976 A1* | 11/2012 | Tanaka et al. | 382/100 |
| 2012/0300982 A1* | 11/2012 | Tanase et al. | 382/103 |

FOREIGN PATENT DOCUMENTS

| | | |
|---|---|---|
| EP | 2154630 A1 | 2/2010 |
| JP | 2000-022942 A | 1/2000 |
| JP | 2008-269027 A | 11/2008 |
| JP | 2009-123234 A | 6/2009 |
| JP | 2010-045613 A | 2/2010 |

OTHER PUBLICATIONS

Vailaya, Aditya, and Anil K. Jain. "Detecting sky and vegetation in outdoor images." Electronic Imaging. International Society for Optics and Photonics, 1999.*

Search Report issued in European Application No. 12168859.2 dated May 22, 2013.

Aditya Vailaya et al., "Detecting sky and vegetation in outdoor images", Proceedings of SPIE, vol. 3972, Dec. 23, 1999, p. 411-420, XP055062770.

Vailaya A. et al., "On Image Classification: City Images vs. Landscapes", Pattern Recognition, Elsevier, GB, vol. 31, No. 12, Dec. 1, 1998, p. 1921-1935, XP027120415.

Elaine Yiu, "Image Classification Using Color Cues and Texture Orientation". Master Thesis at the MIT, MIT USA, Retrieved from the Internet: URL: http://dspace.mit.edu/bitstream/handle/1721.1/10897/35562702.pdf?sequence=1[retrieved on Apr. 22, 2013], May 28, 1996, p. 1-61, XP055060606.

Julia Vogel et al., "Natural Scene Retrieval Based on a Semantic Modeling Step", Image and Video Retrieval; [Lecture Notes in Computer; LNCS], Springer-Verlag, Berlin/Heidelberg, Jun. 25, 2004, p. 207-215, XP019008931.

Singhal A. et al., "Probabilistic spatial context models for scene content understanding", Proceedings/2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A., vol. 1, Jun. 18, 2003, p. 235-241, XP010644903.

Boutell M. R. et al. "Improved Semantic Region Labeling Based on Scene Context", IEEE International Conference Multimedia and Expo, 2005. ICME 2005. Amsterdam, The Netherlands, Jul. 6-8, 2005, IEEE, Piscataway, NJ, USA, Jul. 6, 2005, IEEE Plscataway, NJ, USA, Jul. 6, 2005 p. 980-983, XP010843205.

Bosch et al., "Which is the best way to organize/classify images by content?", Image and Vision Computing, Elsevier, Guildford, GB, vol. 25, No. 6, Apr. 6, 2007, p. 778-791, XP022022909.

Van Gemert J.C. et al., "Robust Scene Categorization by Learning Image Statistics in Context", Computer Vision and Pattern Recognition Workshop, 2006 Conference on New York, NY, USA, Jun. 17-22, 2006, Piscataway, NJ, USA, IEEE, Piscataway, NJ, USA, Jun. 17, 2006, XP010922919.

Office Action issued by European Patent Office in Application No. 12168859.2 dated Sep. 12, 2012.

"Algorithm-Independent Machine Learning", Bibliography, Chapter 9, p. 453-p. 515, XP002472161.

Martin Szummer et al. "Indoor-Outdoor Image Classification", MIT Media Lab Rm E15-384; 20 Ames St; Cambridge, MA 02139; USA, szummer©media.mit.edu/~szummer/, 1997, p. 42-p. 51, XP010261518.

Office Action issued by Japanese Patent Office in Japanese Application No. 2011-114660 dated Apr. 16, 2013.

Takahiro Toyoda et al., "Conditional Random Fields: Integration of Local Information and Global Information for Image Labeling", IEICE Translations, Japan, The Institute of Electronics Information and Communication Engineers, vol. J90-D, No. 6, Jun. 1 2007, p. 1542-1554.

Office Action issued by Chinese Patent Office in Chinese Application No. 201210121063.3 mailed Apr. 3, 2014.

Ni Rong-rong, Ruan Qiu-qi, "An adaptive watermarking based on iteration mapping and image content", Journal of China Institute of Communications, vol. 25, No. 5, May 2004, p. 182, 184-185.

* cited by examiner

Fig.3
(A)
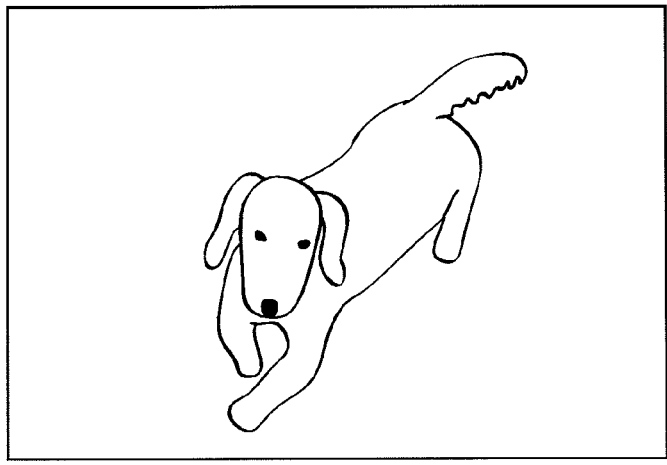
(B)
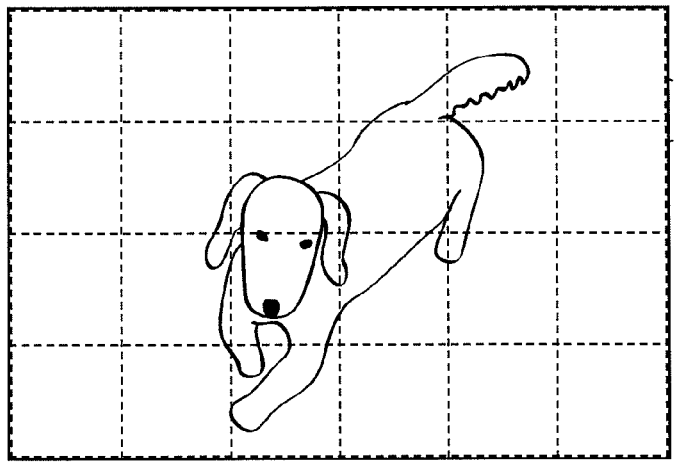
(C)
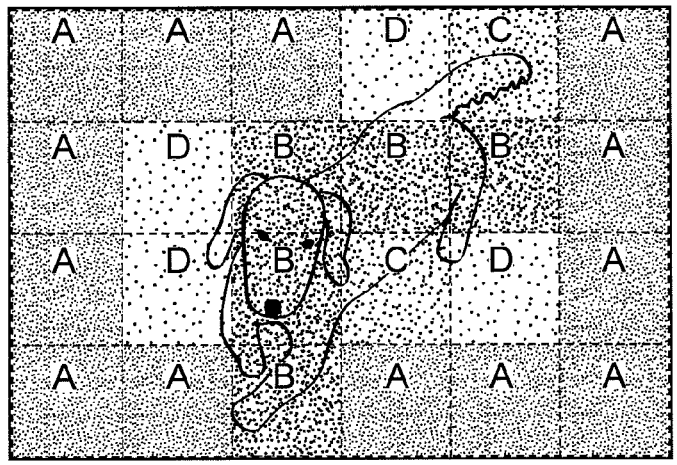

Fig.4

IMAGE ID: OOOO

| BLOCK No.1 |
|---|
| BLOCK No.2 |
| BLOCK No.3 |
| BLOCK No.4 |
| ⋮ |
| ⋮ |
| ⋮ |
| BLOCK No.256 |

| CLASSIFICATION | FEATURE QUANTITY |
|---|---|
| LOCAL FEATURE QUANTITY | AVERAGE AND VARIANCE OF PIXEL VALUES, COLOR DIFFERENCE VALUES, AND INTENSITY VALUES OF TARGET BLOCK IMAGE |
| | MAGNITUDE OF EDGE IN HORIZONTAL DIRECTION AND EDGE IN VERTICAL DIRECTION IN TARGET BLOCK IMAGE |
| | RATIO OF MAGNITUDE OF EDGE IN HORIZONTAL DIRECTION WITH RESPECT TO MAGNITUDE OF EDGE IN VERTICAL DIRECTION IN TARGET BLOCK IMAGE |
| | FREQUENCY FOR EACH OF CLASSES X1 TO Xn IN Y HISTOGRAM OF TARGET BLOCK IMAGE |
| | SIMILARITY BETWEEN PIXEL VALUE AND SKIN COLOR OF TARGET BLOCK IMAGE |
| | ⋮ |
| NEIGHBOR FEATURE QUANTITY | LOCAL FEATURE QUANTITY OF EACH NEIGHBORING BLOCK IMAGE |
| | AVERAGE AND VARIANCE OF PIXEL VALUES, COLOR DIFFERENCE VALUES, AND INTENSITY VALUES OF NEIGHBORING BLOCK IMAGES B4, B5 IN COMBINATION |
| | AVERAGE AND VARIANCE OF PIXEL VALUES, COLOR DIFFERENCE VALUES, AND INTENSITY VALUES OF NEIGHBORING BLOCK IMAGES B6, B8 IN COMBINATION |
| | ⋮ |
| SUB-GLOBAL FEATURE QUANTITY | AVERAGE AND VARIANCE OF PIXEL VALUES, COLOR DIFFERENCE VALUES, AND INTENSITY VALUES OF ALL PIXELS IN HORIZONTAL DIRECTION AND VERTICAL DIRECTION |
| | AVERAGE AND VARIANCE OF PIXEL VALUES, COLOR DIFFERENCE VALUES, AND INTENSITY VALUES IN AREA TO WHICH TARGET BLOCK IMAGE BELONGS AMONG AREAS INTO WHICH ALL PIXELS IN HORITONAL DIRECTION AND IN VERTICAL DIRECTION ARE BISECTED |
| | AVERAGE AND VARIANCE OF PIXEL VALUES, COLOR DIFFERENCE VALUES, AND INTENSITY VALUES OF PIXELS IN AN AREA OF A CERTAIN SIZE INCLUDING TARGET BLOCK IMAGE AND HAVING A CERTAIN SIZE |
| | ⋮ |
| GLOBAL FEATURE QUANTITY | AVERAGE AND VARIANCE OF PIXEL VALUES, COLOR DIFFERENCE VALUES, AND INTENSITY VALUES OF TARGET IMAGE |
| | MAGNITUDE OF EDGE IN HORIZONTAL DIRECTION AND EDGE IN VERTICAL DIRECTION IN TARGET IMAGE |
| | FREQUENCY FOR EACH OF CLASSES X1 TO Xm IN U HISTOGRAM OF TARGET IMAGE |
| | FREQUENCY FOR EACH OF CLASSES X1 TO Xs IN V HISTOGRAM OF TARGET IMAGE |
| | AVERAGE AND VARIANCE OF PIXEL VALUES, COLOR DIFFERENCE VALUES, AND INTENSITY VALUES IN FOUR CORNER AREAS IN TARGET IMAGE |
| | MAGNITUDE OF EDGE IN HORIZONTAL DIRECTION AND EDGE IN VERTICAL DIRECTION IN FOUR CORNER AREAS IN TARGET IMAGE |
| | FREQUENCY FOR EACH OF CLASSES X1 TO Xk IN HISTOGRAM OF MAGNITUDE OF EDGE IN EACH DIRECTION AT ANGULAR INTERVALS OF 45 DEGREES OF BLOCK IMAGES IN TARGET IMAGE |
| | ⋮ |

Fig.6
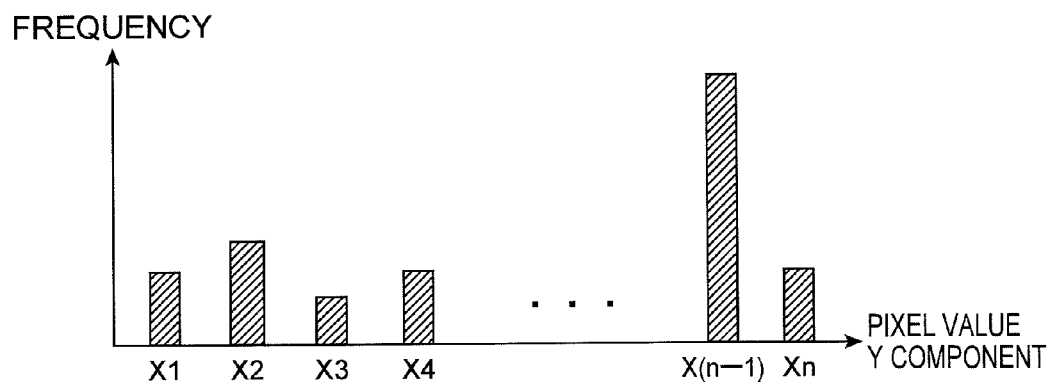
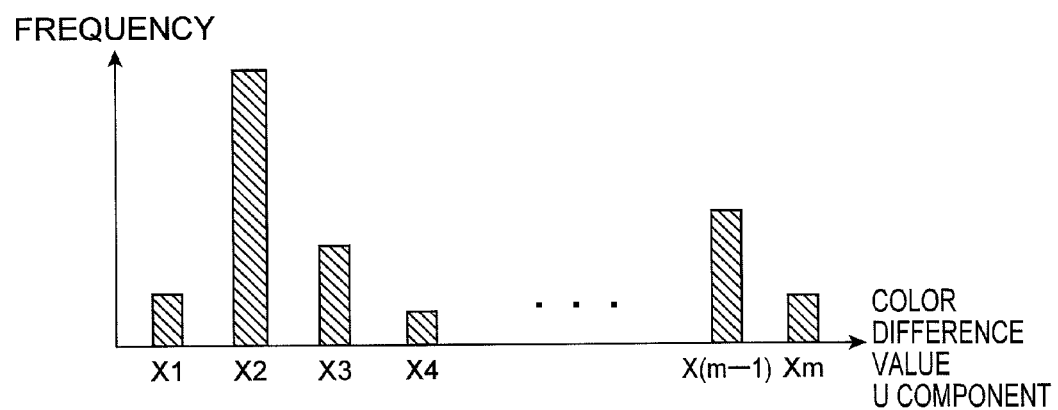
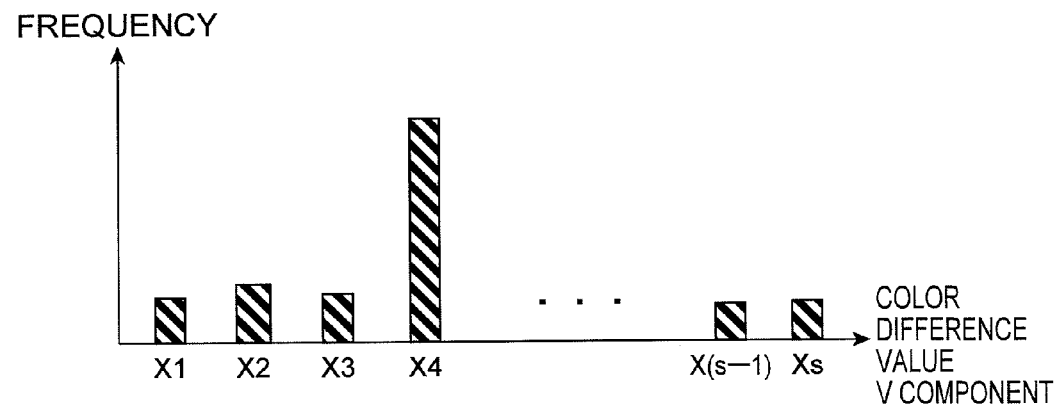

Fig.8
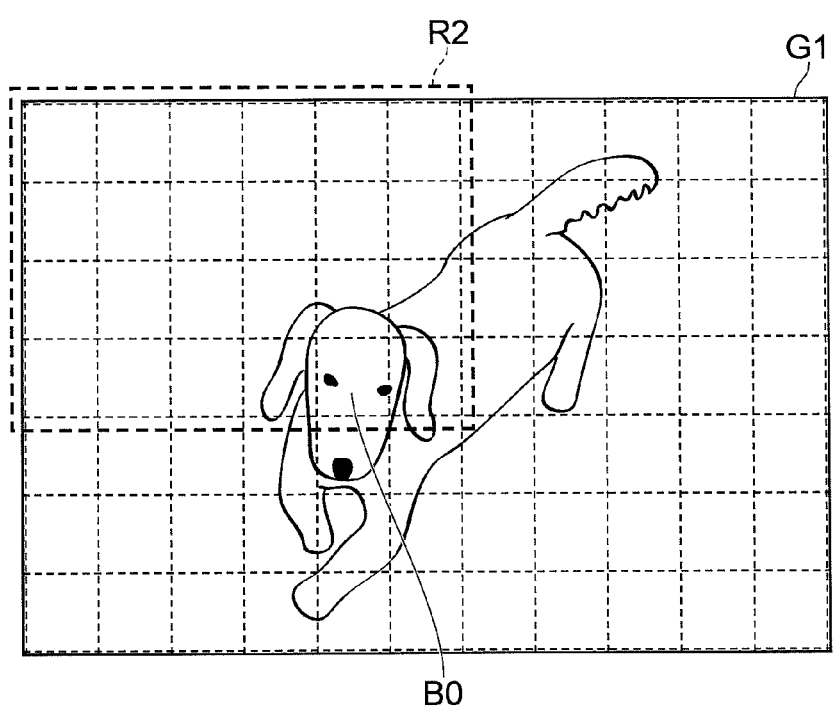
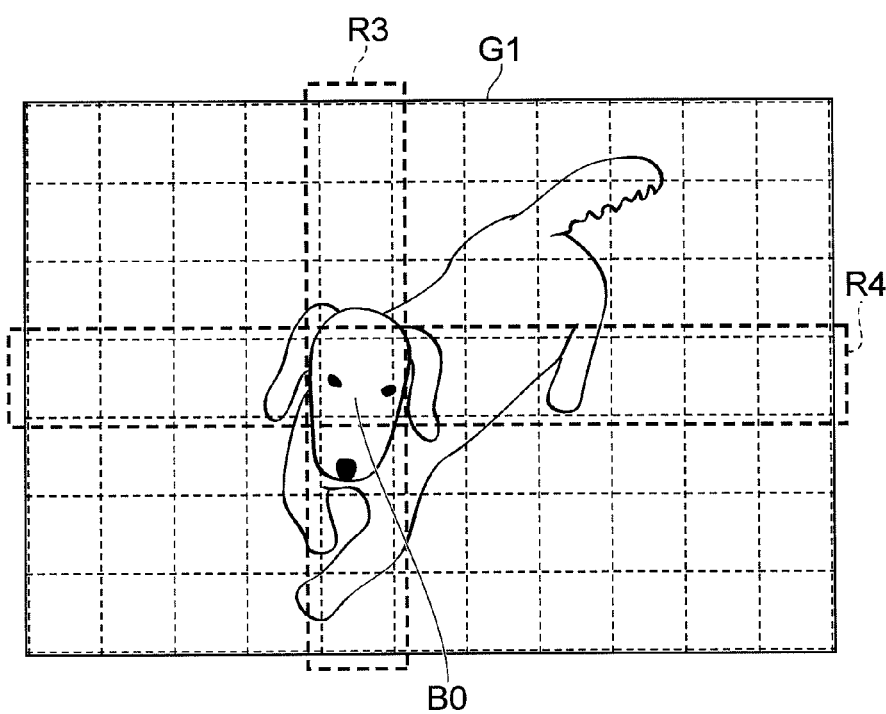

Fig.9
(A)
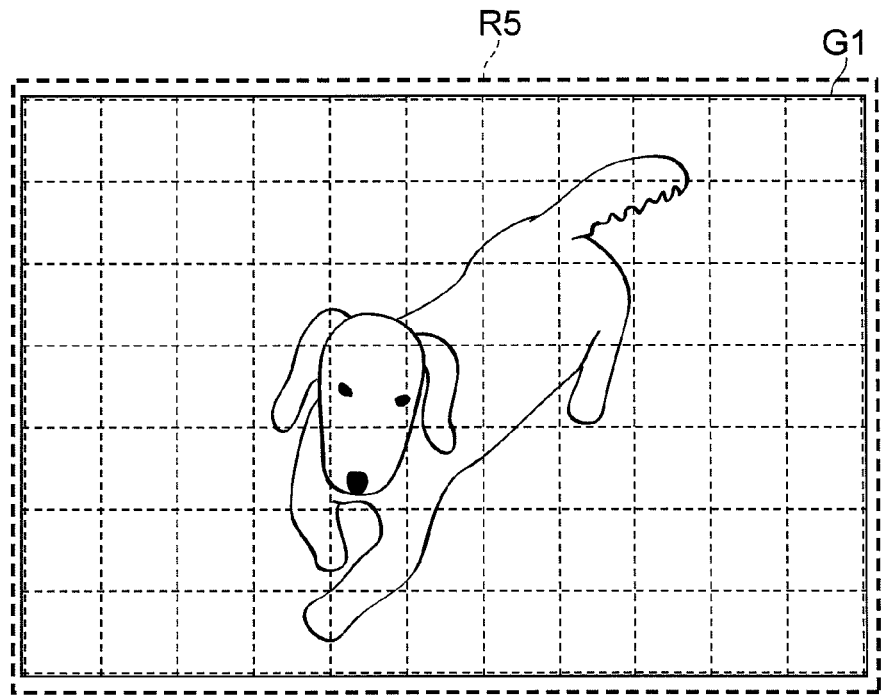
(B)
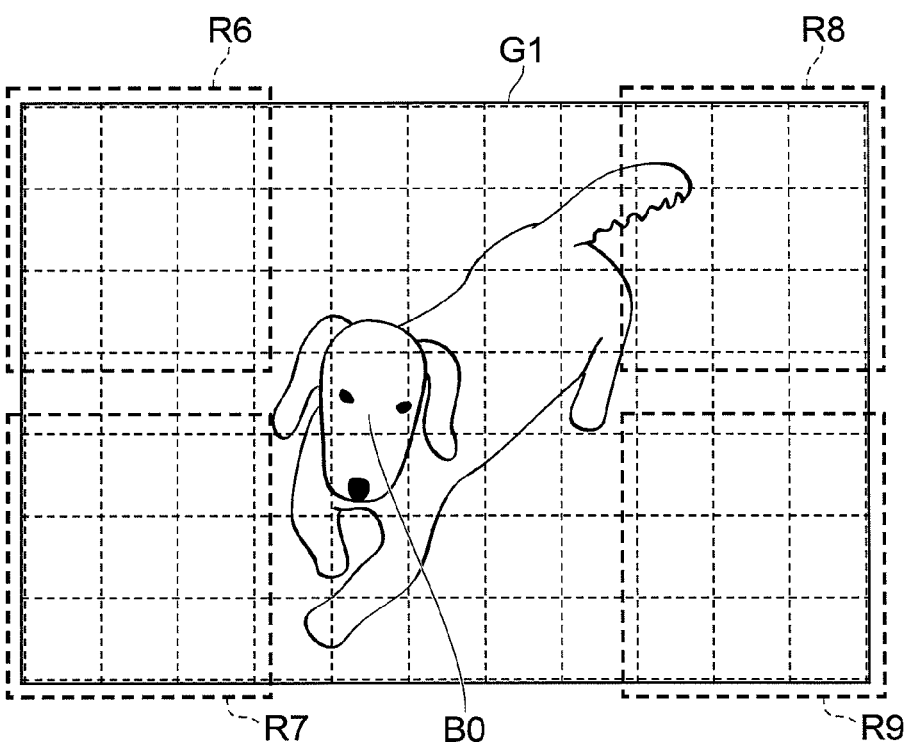

Fig.12
(A)
(B)
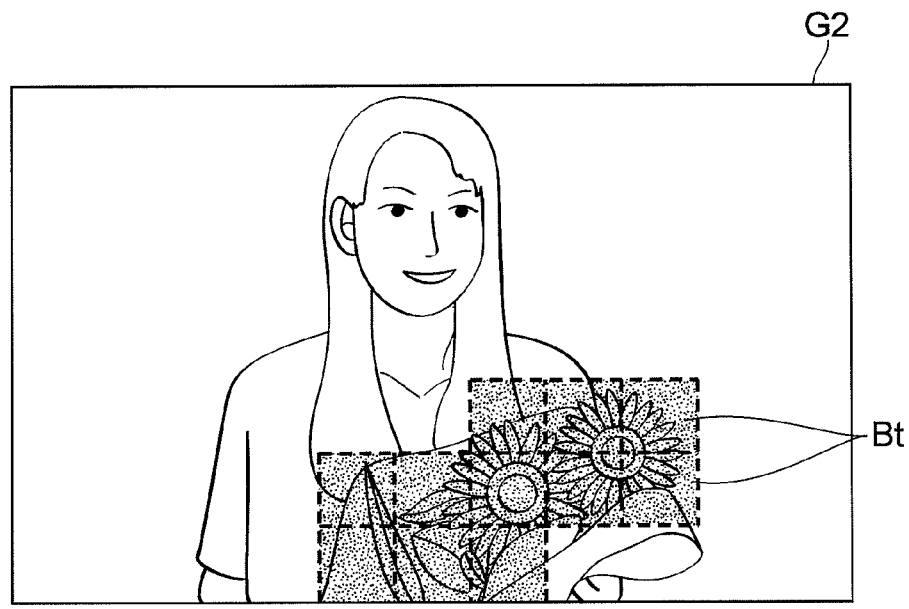

IMAGE IDENTIFICATION DEVICE, IMAGE IDENTIFICATION METHOD, AND RECORDING MEDIUM

CROSS-REFERENCE TO RELATED APPLICATIONS

The disclosure of Japanese Patent Application No. JP2011-114660 filed on May 23, 2011 including the specification, drawings and abstract is incorporated herein by reference in its entirety.

BACKGROUND OF THE INVENTION

1. Field of the Invention

Various aspects and embodiments of the present invention relate to an image identification device, an image identification method, an image identification program, and a recording medium.

2. Related Background Art

As an image identification device, conventionally known is a device that divides a target image to be identified into blocks to form block images and classifies the block images into a plurality of predetermined categories (see Patent Document 1, for example). A device described in Patent Document 1 uses a training image to learn a separating plane for each category in a feature quantity space using features of an image as coordinate axes and classifies block images into categories on the basis of the separating plane and coordinate positions corresponding to the magnitudes of feature quantities of the block images. The feature quantities of the block images are pieces of image information of these block images (color space information and frequency components).

Patent Document 1: Japanese Unexamined Patent Application Publication No. 2010-45613

SUMMARY OF THE INVENTION

However, in the image identification device described in Patent Document 1, classifying block images into appropriate categories is difficult in some cases. For example, when block images are in all blue, it is difficult to determine whether the category of these blocks is "sky" or "pond".

In the present technical field, desired is an image identification device, an image identification method, and a recording medium that can improve classification accuracy of block images obtained by dividing a target image.

An image identification device according to one aspect of the present invention is an image identification device that learns in advance a separating plane used for classifying images into predetermined categories in a feature quantity space using a feature of the image as a coordinate axis and uses the separating plane to classify block images obtained by dividing a target image into the categories. The image identification device is configured to include an input unit that inputs the target image, a block image generation unit that divides the target image into a plurality of blocks to generate the block images, a feature quantity computing unit that computes feature quantities of the block images, and a category determination unit that determines whether the block images are classified into one of the categories or not, using the separating plane and coordinate positions corresponding to magnitudes of feature quantities of the block images in the feature quantity space, wherein the feature quantity computing unit uses, as a feature quantity of a given target block image in the block images, local feature quantities calculated according to image information of the target block image and a global feature quantity calculated according to image information of the target image.

Since the image identification device according to the aspect of the present invention uses, as feature quantities of the target block image, not only the local feature quantities calculated according to image information of the target block image, but also the global feature quantity calculated according to image information of the target image, it is possible to classify the target block image in consideration of not only information on the target block image themselves but also a relationship between the target block image and the target image. Accordingly, even when it is impossible to determine categories only according to block images, there is a case in which it becomes possible to determine categories of the block images by looking at the target image. Therefore, it is possible to improve classification accuracy of the block images.

Herein, the feature quantity computing unit may use, as the global feature quantity, a feature quantity calculated according to image information of four corner areas in the target image. By configuring the image identification device in this manner, a feature that emerges when a circular matter is a subject can be made included as the feature quantities of the block images.

In addition, the feature quantity computing unit may use, as a feature quantity of a given target block image in the block images, a neighbor feature quantity calculated according to image information of neighboring block images that are block images surrounding the target block image. By configuring the image identification device in this manner, it is possible to classify block images in consideration of a relationship between block images and its surrounding block images.

In addition, the feature quantity computing unit may use, as the neighbor feature quantity, a feature quantity calculated according to image information of the block image selected from the neighboring block images. By configuring the image identification device in this manner, a symmetric degree of the neighboring block images can be made included in the feature quantities of the block images, thereby it is possible to classify the block images in more consideration of the relationship between block images and its surrounding block images.

In addition, the feature quantity computing unit may select, among neighboring block images of the target block image, ones existing symmetrically with respect to the target block image. By configuring the image identification device in this manner, not only are feature quantities of neighboring blocks each calculated individually used, but also a feature quantity of block sets according to its symmetric degree can be calculated, thereby it is possible to classify a subject having a symmetric shape in a direction side-to-side, up-and-down, or the like from background.

In addition, the feature quantity computing unit may use, as the feature quantity of the target block image, a sub-global feature quantity calculated according to image information of a partial area that comprises a plurality of block images including the target block image. By configuring the image identification device in this manner, it is possible to classify the block images in consideration of the relationship between block images and its surrounding block images.

Furthermore, the feature quantity computing unit may use, as the sub-global feature quantity, a feature quantity calculated according to image information of the partial area that comprises block images occupying a horizontally long area including the target block image, and a feature quantity calculated according to image information of the partial area that comprises block images occupying a vertically long area including the target block image. By configuring the image identification device in this manner, it is possible to classify the block images so as to appropriately identify a subject, background and the like having a feature in horizontal/vertical direction.

In addition, an image identification method according to another aspect of the present invention is an image identification method for learning in advance a separating plane used for classifying images into predetermined categories in a feature quantity space using a feature of the image as a coordinate axis and then using the separating plane to classify block images obtained by dividing a target image into the categories. The image identification method is configured to include an input step of inputting the target image, a block image generation step of dividing the target image into a plurality of blocks to generate the block images, a feature quantity computing step of computing feature quantities of the block images, and a category determination step of determining whether the block images are classified into one of the categories or not, using the separating plane and coordinate positions corresponding to magnitudes of feature quantities of the block images in the feature quantity space, wherein at the feature quantity computing step, as a feature quantity of a given target block image in the block images, local feature quantities calculated according to image information of the target block image and a global feature quantity calculated according to image information of the target image are used.

In addition, a recording medium according to still another aspect of the present invention is a computer-readable recording medium in which an image identification program is stored that causes a computer to operate so as to learn in advance a separating plane used for classifying images into predetermined categories in a feature quantity space using a feature of the image as a coordinate axis and use the separating plane to classify block images obtained by dividing a target image into the categories. The recording medium is configured as a recording medium in which an image identification program is stored that causes the computer to operate as an input unit that inputs the target image, a block image generation unit that divides the target image into a plurality of blocks to generate the block images, a feature quantity computing unit that computes feature quantities of the block images, wherein the feature quantity computing unit uses, as a feature quantity of a given target block image in the block images, local feature quantities calculated according to image information of the target block image and a global feature quantity calculated according to image information of the target image, and a category determination unit that determines whether the target block image is classified into one of the categories or not, using the separating plane and coordinate positions corresponding to magnitudes of feature quantities of the target block image in the feature quantity space.

The above-described image identification method, the image identification program, and the recording medium in which the image identification program is recorded exert the same effect as the above-described image identification device according to the present invention.

According to the above-described various aspects and embodiments of the present invention, it is possible to improve classification accuracy of block images obtained by dividing a target image.

BRIEF DESCRIPTION OF THE DRAWINGS

FIGS. 3A to 3C are schematic diagrams for explaining image recognition of a target image on a block-by-block basis. FIG. 3A illustrates the target image, FIG. 3B illustrates the target image divided into blocks, and FIG. 3C illustrates the target image classified on a block-by-block basis.

FIG. 4 illustrates one example of image feature quantities for each block.

FIGS. 6A to 6C are examples of histograms of pixel values and color difference values. FIG. 6A is a histogram of Y component, FIG. 6B is a histogram of U component, and FIG. 6C is a histogram of V component.

FIGS. 8A and 8B are schematic diagrams for explaining sub-global feature quantity. FIG. 8A is a schematic diagram indicating an area extending vertically and horizontally, and FIG. 8B is a schematic diagram indicating an area extending vertically and an area extending horizontally.

FIGS. 9A and 9B are schematic diagrams for explaining a global feature quantity. FIG. 9A is a schematic diagram indicating a whole area, and FIG. 9B is a schematic diagram indicating four corner areas.

FIG. 12A illustrates one example of training data. FIG. 12B is a schematic diagram for explaining learning on a block-by-block basis.

DESCRIPTION OF THE PREFERRED EMBODIMENTS

Figure 1:
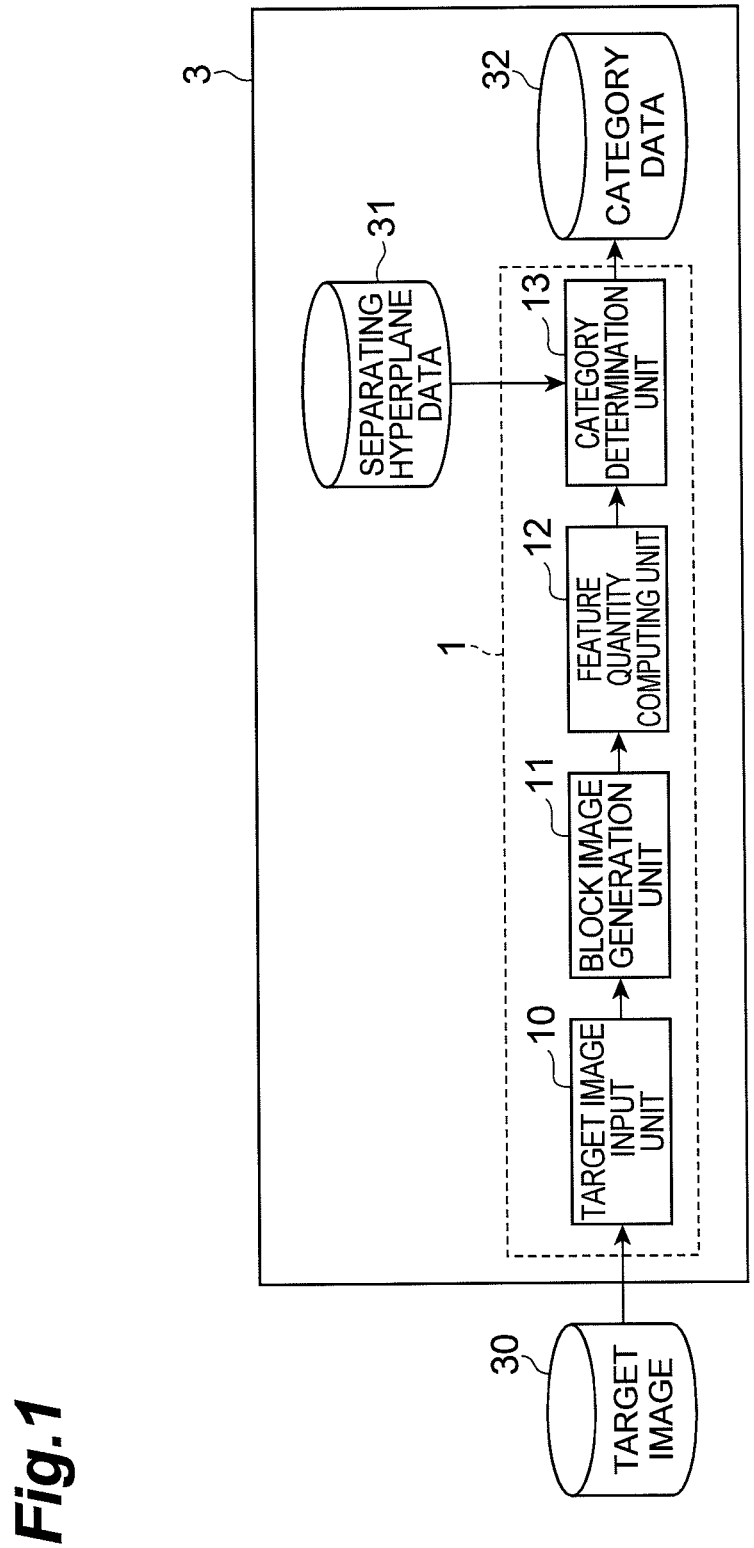
FIG. 1 is a functional block diagram of a mobile terminal incorporating an image identification device according to an embodiment.

Embodiments of the present invention will be described hereinafter with reference to the attached drawings. Note that like reference signs are given to like parts in descriptions of the drawings, and redundant explanations are omitted. In addition, dimensional ratios in the drawings do not necessarily match those in the descriptions.

First Embodiment

An image identification device according to the present embodiment is a device that divides a target image into a certain size of block images and recognizes a subject on a block-by-block basis, and can be, for example, a device incorporated in a mobile phone, a digital camera, a personal digital assistant (PDA), a conventional computer system, or the like. Note that in the following descriptions, for ease of understanding, as one example of the image identification device according to the present invention, an image identification device incorporated in a mobile terminal will be explained.

Figure 2:
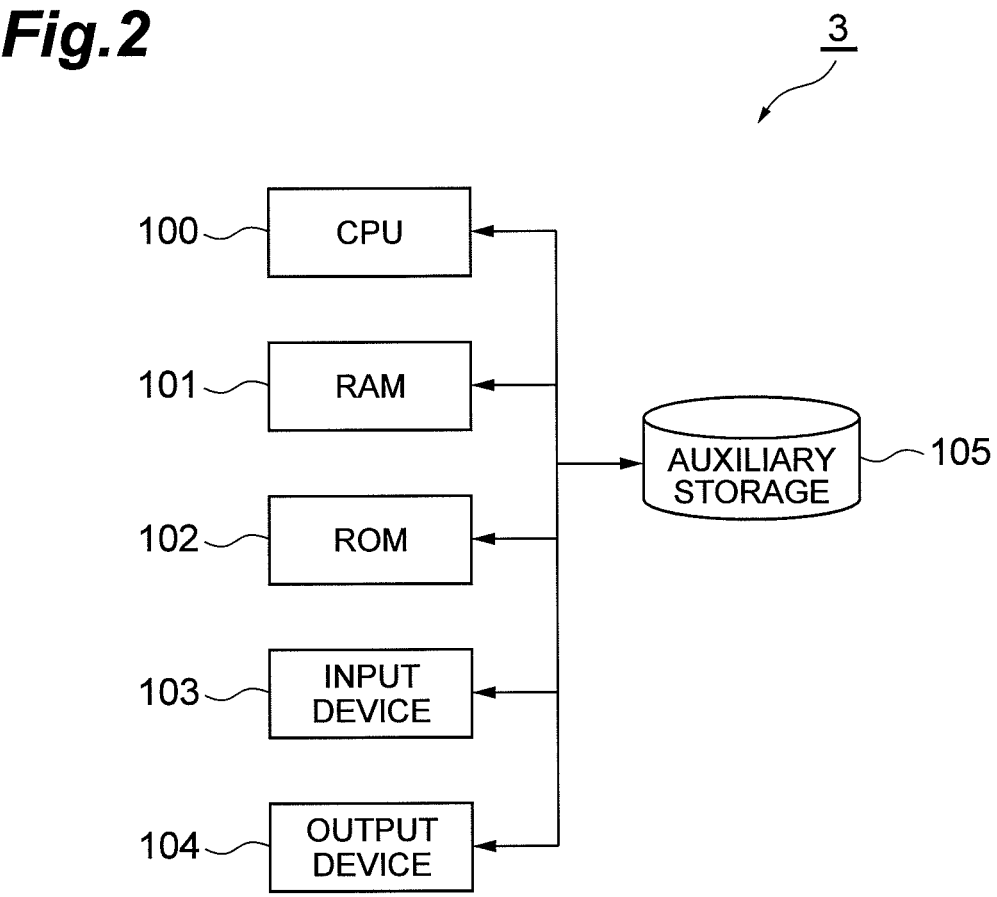
FIG. 2 is a hardware block diagram of the mobile terminal in which the image identification device depicted in FIG. 1 is incorporated.

FIG. 1 is a functional block diagram of this mobile terminal 3 including this image identification device 1 according to the present embodiment. The mobile terminal 3 depicted in FIG. 1 is a mobile terminal carried by a user, for example, and has a hardware configuration depicted in FIG. 2. FIG. 2 is a hardware block diagram of the mobile terminal 3. As depicted in FIG. 2, the mobile terminal 3 is physically configured as a conventional computer system including a central processing unit (CPU) 100, main memories such as a read only memory (ROM) 101 and a random access memory (RAM) 102, an input device 103 such as a camera or a keyboard, an output device 104 such as a display, an auxiliary storage 105 such as a hard disk drive. Each function of the mobile terminal 3 and the image identification device 1 described later is implemented by causing the input device 103 and the output device 104 to operate under control of the CPU 100 by loading predetermined computer software into hardware such as the CPU 100, the ROM 101, and the RAM 102, and additionally by reading and writing data in the main memories or the auxiliary storage 105. Although the above explanation has been made for the case where the mobile terminal 3 has such a hardware configuration, alternatively, the image identification device 1 may be configured as a conventional computer system including the CPU 100, the main memories such as the ROM 101 and the RAM 102, the input device 103, the output device 104, and the auxiliary storage 105. In addition, the mobile terminal 3 may include a communication module or the like.

As depicted in FIG. 1, the mobile terminal 3 includes the image identification device 1, a separating hyperplane data (separating plane data) 31, and category data 32.

The image identification device 1 includes a target image input unit 10, a block image generation unit 11, a feature quantity computing unit 12, and a category determination unit 13. The target image input unit 10 has a function of inputting a target image 30 as image data to be identified. The target image input unit 10, for example, may input the target image 30 captured by a camera incorporated in the mobile terminal 3, or may input the target image 30 via communications. The target image input unit 10 stores the target image 30 in the main memories or the auxiliary storage 105 of the mobile terminal 3, for example.

The block image generation unit 11 has a function of dividing the target image 30 input into blocks each having a certain area to generate block images. For example, the block image generation unit 11 divides a target image G1 depicted in FIG. 3A into a plurality of block images BL as depicted in FIG. 3B. The block image generation unit 11 divides the target image G1 into four blocks high by six blocks wide as depicted in FIG. 3B, for example. Alternatively, the block image generation unit 11 may divide the target image G1 into 16 blocks high by 16 blocks wide, or may divide it in any other ratio. The block image generation unit 11 may first resize the target image G1 such that the length of the long side thereof becomes equal to or smaller than a predetermined value and divide the target image G1 thus resized. The block image generation unit 11 has a function of outputting the block images to the feature quantity computing unit 12.

The feature quantity computing unit 12 has a function of calculating a feature quantity for each of the block images BL. The feature quantity computing unit 12 calculates feature quantities from image information such as pixel values or edge information of the block images BL. In other words, the feature quantities are quantities in which features of a subject are reflected. Note that it is possible to represent the magnitudes of the feature quantities as position coordinates in a feature quantity space using features as coordinate axes.

For example, for a p-dimensional feature quantity, the magnitude of the feature quantity will be represented by a coordinate position of $(\beta_1, \beta_2, \ldots, \beta_p)$. Details of the feature quantities will be described later. The feature quantity computing unit 12 has a function of outputting a feature quantity of each of the block images BL to the category determination unit 13.

The category determination unit 13 has a function of classifying the block images BL into predetermined categories on the basis of feature quantities of the block images BL. Examples of the predetermined categories include, for example, "sea", "mountain", "sky", "evening glow", "red leaves", "cherry blossoms", "snow", "characters/memorandum", "person", "dishes", "beach", "flower", "green", "dog", or "building". In addition, it is acceptable to make the predetermined categories include an "empty set". By presetting the "empty set", when a right category does not exist for an image, instead of forcibly determining the image to belong to an existing category, it is possible to determine the image to belong to the "empty set" (i.e., belong to nothing). Accordingly, it is possible to reduce misclassifications. The separating hyperplane data 31 includes a separating hyperplane that is learned in advance for each of the above-mentioned categories on the basis of training data. The separating hyperplane is defined by the following formula I with p-dimensional feature quantity data $J=(\alpha_1, \alpha_2, \ldots, \alpha_p)$, vector=$(w_1, w_2, \ldots, w_p)$, and a constant z.

$$w_1 \cdot \alpha_1 + w_2 \cdot \alpha_2 + \ldots + w_p \cdot \alpha_p + z = 0 \tag{1}$$

A learning process of the separating hyperplane data 31 will be described later. The category determination unit 13 refers to the separating hyperplane data 31 and classifies the block images BL into the above-mentioned categories. The category determination unit 13 determines whether the block images BL are classified into the above-mentioned categories. The category determination unit 13 compares a feature quantity of each of the block images BL with a separating hyperplane for a given category and, when the magnitude of the feature quantity is larger than the separating hyperplane, determines the block image to belong to the category. On the other hand, the category determination unit 13, when the magnitude of the feature quantity is not larger than the separating hyperplane, determines the block diagram not to belong to the category. For example, it is assumed that four categories A to D are set in advance, and learning the respective separating hyperplanes therefor has been completed. As depicted in FIG. 3C, the category determination unit 13 compares a feature quantity of each of the block images BL with the separating hyperplane for each of the categories A to D to classify the block images BL into the categories A to D. More specifically, the category determination unit 13 compares, in the feature quantity space, the separating hyperplane for each category represented by the above formula I with p-dimensional feature quantity data $O=\beta_1, \beta_2, \ldots, \beta_p)$ obtained by the feature quantity computing unit 12. For example, the category determination unit 13 substitutes feature quantity data obtained from the image feature quantity computing process into the left-hand side of the above formula I for each category to calculate the signed distance between the separating hyperplane and coordinates $(\beta_1, \beta_2, \ldots, \beta_p)$ in the feature quantity space, and judges the sign of the distance. Note that the category determination unit 13, when determining that a magnitude of a feature quantity of a block image BL is not larger than any hyperplane, judges the block image BL to be "not applicable". In addition, when a block image BL belongs to two or more categories, the category determination unit 13 determines that the block image BL belongs to the category in accordance with a preset priority. The category determination unit 13 outputs the output results to the category data 32.

Details of feature quantities will be described hereinafter. The feature quantity computing unit 12 adopts four feature quantities as feature quantities of a block image as depicted in FIG. 4. FIG. 4 illustrates feature quantities for each of blocks No. 1 to No. 256 in a target image (image ID: OOOO).

Figure 5:
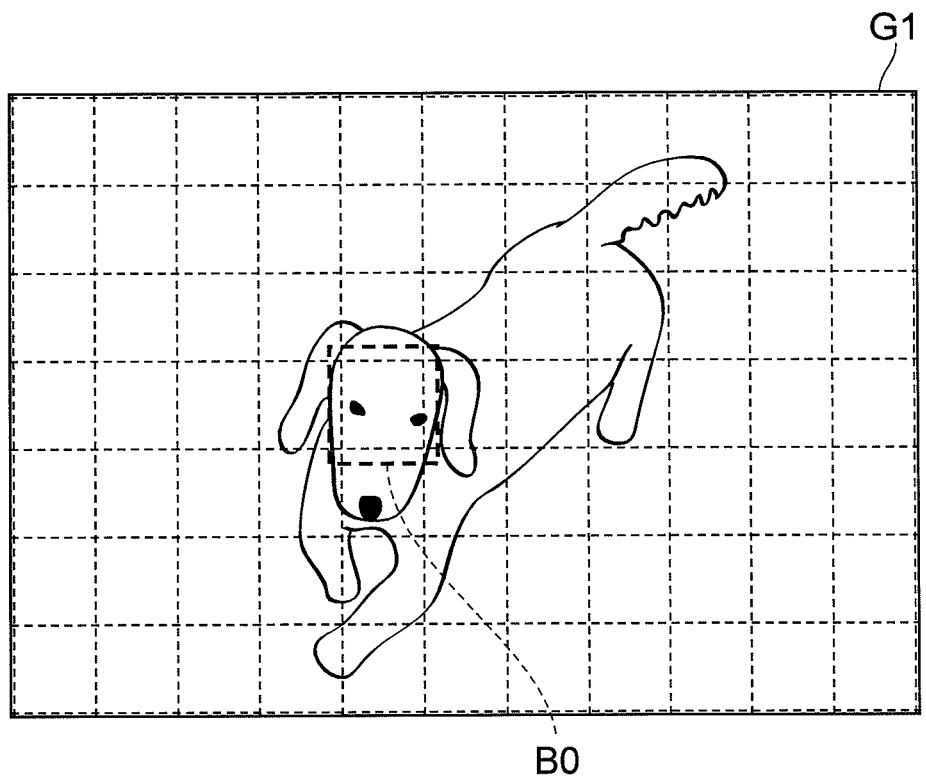
FIG. 5 is a schematic diagram for explaining local feature quantities.

The first feature quantity is a local feature quantity. The local feature quantity is calculated according to image information of the block image itself to be classified. For example, the local feature quantity is calculated by using image information of a given target block image B0 of the target image G1 depicted in FIG. 5. The local feature quantity includes, for example, the average and the variance of each of pixel values (Y component), color difference values (U component, V component), and intensity values (S component) of the target block image B0, the magnitude of an edge in the horizontal direction and the magnitude of the edge in the vertical direction in the target image B0, the ratio of the magnitude of the edge in the horizontal direction with respect to the magnitude of the edge in the vertical direction in the target block image B0, a histogram of Y component in the target block image B0, or the degree of similarity between a pixel value and skin color of the target block image B0.

Note that the degree of similarity between a pixel value and skin color of the target block image B0 is a feature quantity included for identifying the category "person", and it is acceptable not to adopt such feature quantity when predetermined categories do not include the "person".

The case of including histograms of pixel values and color difference values as a feature quantity will be described. FIGS. 6A to 6C are histograms for the respective components of the pixel values and color difference values, and the abscissa represents a pixel value component and a color difference value component and the ordinate represents frequency. As depicted in FIGS. 6A to 6C, the pixel value component and a color difference value component are classified into classes with a predetermined range interval. For example, as depicted in FIG. 6A, pixel values 0 to 255 in Y component are classified into classes X1 to Xn (n is an integer of two or more). As also depicted in FIG. 6B, pixel values 0 to 255 in U component are classified into classes X1 to Xm (m is an integer of two or more). As also depicted in FIG. 6C, pixel values 0 to 255 in V component are classified into classes X1 to Xs (s is an integer of two or more). For example, in a block image, when there are two pixels whose pixel values belong to the class X1 in Y component, "two" becomes the feature quantity. The first feature quantity includes frequency for each of the classes X1 to Xm depicted in the Y-component histogram as a feature quantity.

Figure 7:
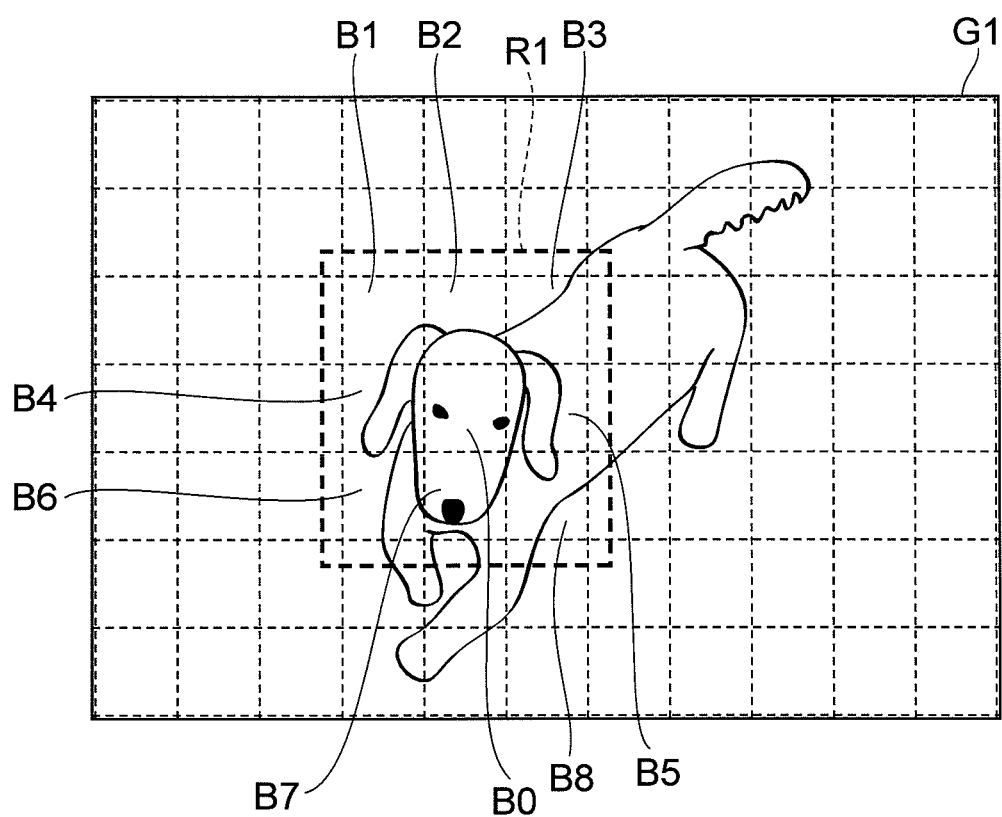
FIG. 7 is a schematic diagram for explaining neighbor feature quantities.

The second feature quantity is a neighbor feature quantity. The neighbor feature quantity is calculated according to image information of neighboring block images that surround the target block image. For example, the neighbor feature quantity is calculated according to the image information of neighboring block images B1 to B8 that surround the given target block image B0 of the target image G1 depicted in FIG. 7. The neighbor feature quantity includes, for example, local feature quantities of the neighboring block images B1 to B8, the average and the variance of pixel values (Y component), color difference values (U component, V component), and intensity values (S component) of the neighboring block images B4 and B5 in combination, or the average and the variance of pixel values (Y component), color difference values (U component, V component), and intensity values (S component) of the neighboring block images B6 and B8 in combination.

Feature quantities for the neighboring block images B4 and B5 and feature quantities for the neighboring block images B6 and B8 are used for judging symmetry of the neighboring block images. For example, for the category "sky", feature quantities tend to be uniform on average and, for the category "person", feature quantities around the person tend to be uniform on average in the background. In this manner, it is acceptable to calculate a feature quantity by using neighboring block images selected from eight neighboring block images. As a selecting method, for example, a method of selecting, among the neighboring block images, ones existing symmetrically with respect to the target block image as the center is applicable.

The third feature quantity is a sub-global feature quantity. The sub-global feature quantity is calculated according to image information of a partial area that comprises a plurality of block images including the target block image. For example, as depicted in FIG. 8A, the sub-global feature quantity is calculated according to image information of a partial area R2 in which the given target block image B0 of the target image G1 is included. Alternatively, the sub-global feature quantity may be calculated according to image information of an area within a circle having its center at the target block image and a certain diameter. As also depicted in FIG. 8B, the sub-global feature is calculated according to image information of a partial area in which the given target block image B0 of the target image G1, the partial area being a partial area R3 constructed of a vertical array of block images or a partial area R4 constructed of a horizontal array of block images. Note that the partial area R3 or R4 is not limited to such an array, and may be a vertically long or horizontally long area including several arrays on the upper and lower, or right and left sides thereof. Alternatively, the sub-global feature quantity may be calculated according to image information of a partial area to which the target block image B0 belongs out of areas into which the partial area R3 or R4 is bisected. In other words, the sub-global feature quantity includes, for example, the average and the variance of pixel values (Y component), color difference values (U component, V component), and intensity values (S component) of all pixels in the horizontal direction and in the vertical direction within the partial area, the average and the variance of pixel values (Y component), color difference values (U component, V component), and intensity values (S component) of an area to which the target block image belongs among areas into which all pixels in the horizontal direction and in the vertical direction within the partial area are bisected, or the average and the variance of pixel values (Y component), color difference values (U component, V component), and intensity values (S component) of pixels in an area of a certain size including the target block image.

By using image information of the partial area R3 constructed of a vertical array of block images or image information in the vertical direction within the partial area, it is possible to use the sub-global feature quantity as a feature quantity in which changes in the vertical direction varying by category are reflected. In addition, by using image information of the partial area R4 constructed of a horizontal array of block images or image information in the horizontal direction within the partial area, it is possible to use the sub-global feature quantity as a feature quantity enabling easy classification of a category such as the category "sky" in which similar pixels tend to be arranged in the horizontal direction.

The fourth feature quantity is a global feature quantity. The global feature quantity is calculated according to image information of the target image as a whole. For example, the global feature quantity is calculated according to image information of the target image G1 as a whole (global area R5) depicted in FIG. 9A. The global feature quantity is also calculated according to image information of four corner areas R6 to R9 in the target image G1 being in a rectangular shape depicted in FIG. 9B. In other words, the global feature quantity includes, for example, the average and the variance of pixel values (Y component), color difference values (U component, V component), and intensity values (S component) of the target image G1, the magnitude of an edge in the horizontal direction and the magnitude of the edge in the vertical direction of the target image G1, the frequency for each of the classes X1 to Xm in the U-component histogram of the target image G1, the frequency for each of the classes X1 to Xs in the V-component histogram of the target image G1, the average and the variance of pixel values (Y component), color difference values (U component, V component), and intensity values (S component) in the four corner areas R6 to R9 of the target image G1, the magnitudes of edges in the horizontal direction and the magnitudes of edges in the vertical direction in the four corner areas R6 to R9 of the target image G1, or the frequency for each of classes X1 to Xk (k is an integer of two or more) in a histogram of the magnitude of an edge in each direction at angular intervals of 45 degrees of block images included in the target image.

By including the pixel values (Y component), color difference values (U component, V component), and intensity values (S component) in the four corner areas R6 to R9 of the target image G1, the magnitude of the edge in the horizontal direction in the four corner areas R6 to R9 and the magnitude of the edge in the vertical direction of the target image G1, it is possible to classify block images by using features emerging in areas at the corners of the target image G1. When a person shoots an image of a circular object such as a dish, from an image-shooting aesthetic point of view, it is often the case that the person shoots the image so that the rim portion of the dish is arranged at four corners. Accordingly, it is possible to appropriately classify the circular object by using the image information in the four corner areas R6 to R9. In each of directions at angular intervals of 45 degrees (0°, 45°, 90°, 135°) of block images included in the target image, in the same manner as in FIG. 6A, by representing the magnitude of the edge in each direction in the classes X1 to Xk and defining the number of pixels belonging to each of the classes X1 to Xk as a feature quantity, when shooting an image of a set meal with a plurality of dishes arranged from above, for example, it is possible to appropriately classify rim portions of a plurality of circular objects. Alternatively, it is acceptable to divide the whole image G1 into 16 pieces or 9 pieces and to use the count of edge values at four corners of the divided areas to be combined to a feature quantity. In this case, it is similarly possible to appropriately classify the rim portions of the circular objects.

Figure 10:
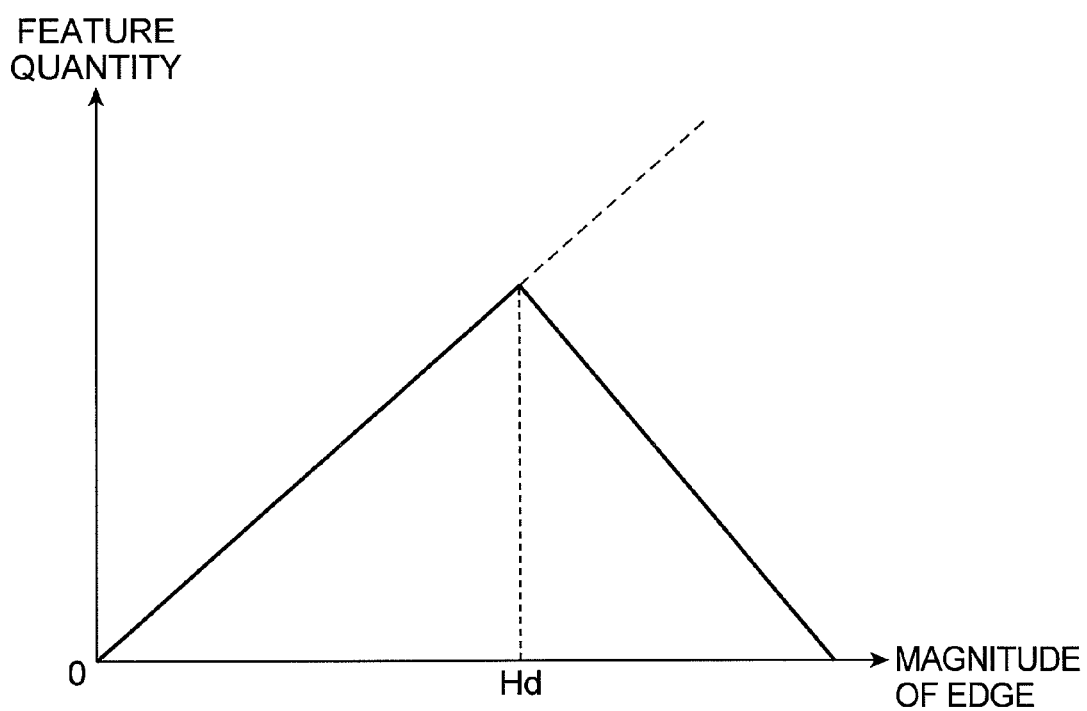
FIG. 10 is a schematic diagram for explaining a feature quantity of edge magnitude.

The frequency for each of the classes X1 to Xm in the U-component histogram of the target image G1 and the frequency for each of the classes X1 to Xs in the V-component histogram of the target image G1 are similar to those depicted in FIGS. 6B and 6C. In addition, when the magnitude of an edge is equal to or larger than a predetermined value, it is acceptable to give low evaluation conversely. For example, as depicted in FIG. 10, it is acceptable to define a relationship between the magnitude of an edge and a feature quantity such that the feature quantity simply increases until the magnitude of the edge reaches a predetermined threshold Hd and simply decreases when the magnitude of the edge becomes equal to or larger than the predetermined threshold Hd. In this case, it is possible to distinguish a block image having a moderate edge magnitude compared with a block image having a small edge magnitude and a block image having a large edge magnitude. For example, it is possible to distinguish between "characters" having a large edge magnitude and "sea" having a moderate edge magnitude.

Figure 11:
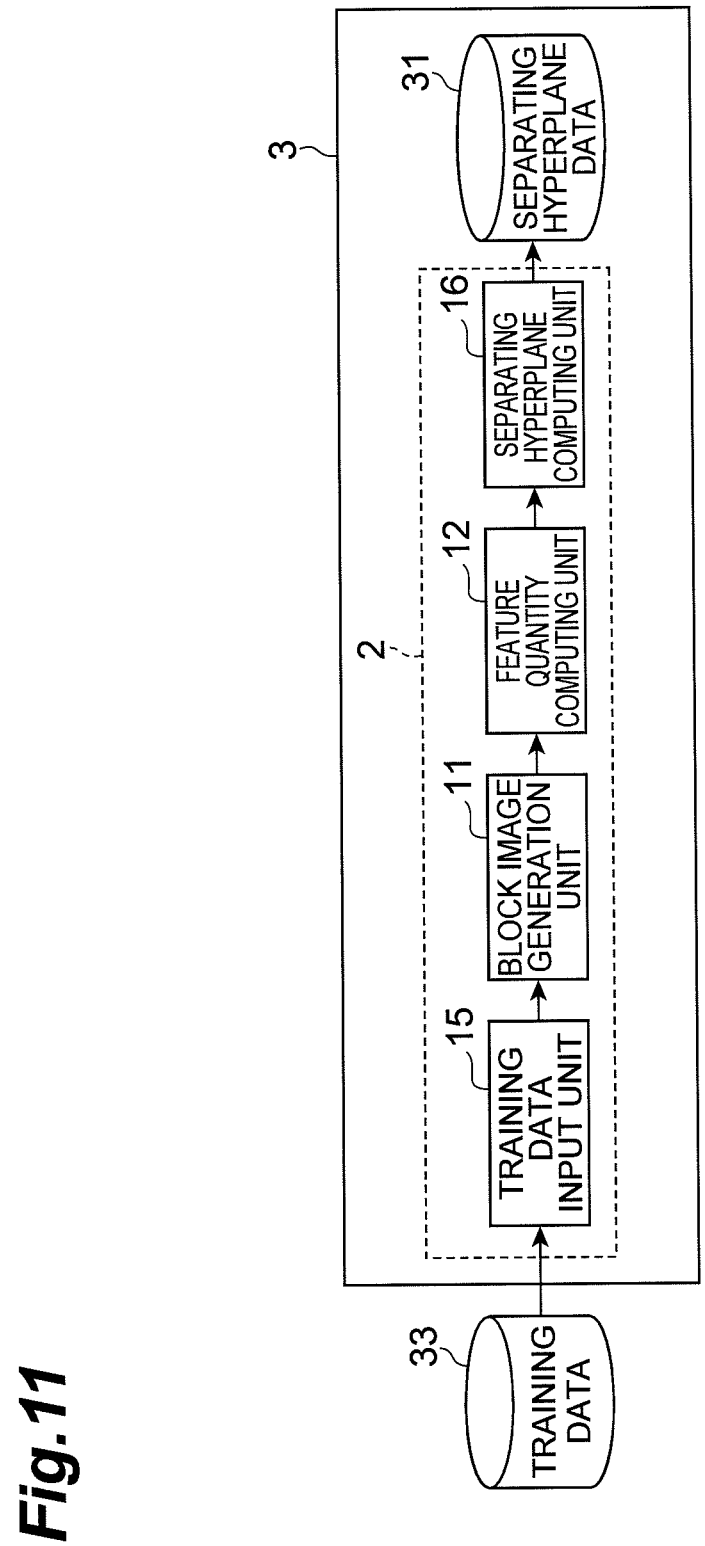
FIG. 11 is a functional block diagram of a device that learns a separating hyperplane.

A learning process of the separating hyperplane data 31 that is performed before the operation of the image identification device 1 will be described hereinafter. FIG. 11 is a functional block diagram of the mobile terminal 3 having a learning device 2. As depicted in FIG. 11, the mobile terminal 3 includes the learning device 2 and the separating hyperplane data 31. Note that the learning device 2 may be fabricated by a computer other than the mobile terminal 3 as needed.

The image identification device 1 includes a training data input unit 15, the block image generation unit 11, the feature quantity computing unit 12, and a separating hyperplane computing unit 16. The training data input unit 15 has a function of inputting a training image 33 as image data to be learned. FIG. 12A is one example of a training image G2 for learning a correct answer for the category "flower". In addition, as depicted in FIG. 12B, information indicating that "flower" is drawn at positions of blocks Bt is made included in training data. In other words, the training data in FIG. 12 is image blocks labeled with the category of the correct answer. The training data may include an image block labeled with a category of an incorrect answer. The training data is prepared for each of the predetermined categories. The training data input unit 15, for example, may input the training image 33 by a camera incorporated in the mobile terminal 3 or may input the training image 33 via communications. The training data input unit 15 stores the target image 30 in the main memories or the auxiliary storage 105 of the mobile terminal 3, for example.

The block image generation unit 11 has a function of dividing the training image 33 input into blocks each having a certain area to generate block images as described above. The feature quantity computing unit 12 has a function of calculating a feature quantity for each of the block images as described above. The feature quantity computing unit 12 has a function of outputting a feature quantity of the block images to the separating hyperplane computing unit 16.

Figure 13:
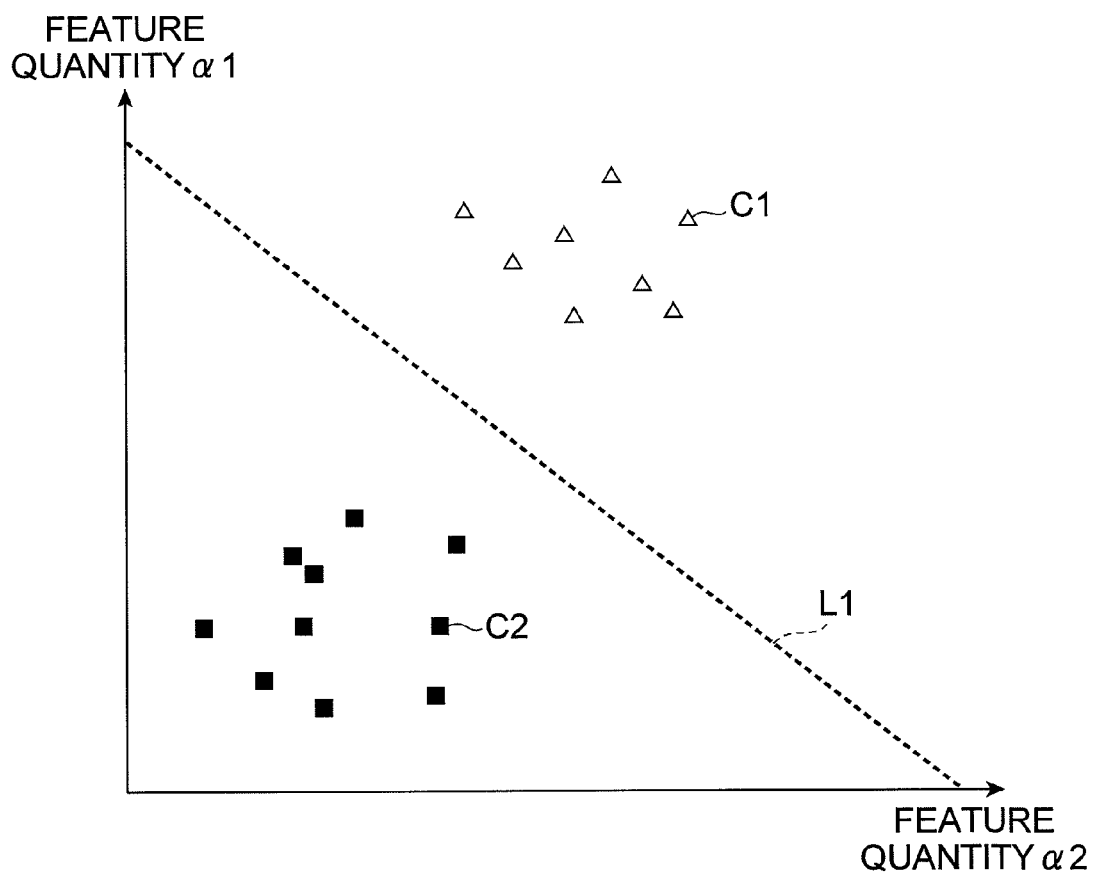
FIG. 13 is a schematic diagram for explaining a separating hyperplane.

The separating hyperplane computing unit 16 has a function of inputting an image feature quantity for each category and calculating a separating hyperplane for each category. The separating hyperplane computing unit 16 calculates a separating hyperplane by using a dedicated library of a linear support vector machine (SVM) that is widely used as a learning algorithm, for example. For ease of understanding, a separating hyperline in a feature quantity plane in two-dimensional image feature quantities α1 and α2 will be described hereinafter. As depicted in FIG. 13, with image feature quantity α1 as abscissa and image feature quantity α2 as ordinate, training data C1 of correct answer and training data C2 of incorrect answer are plotted. In this case, the separating hyperplane computing unit 16 learns a separating hyperline L1 that is a straight line separating the training data C1 of correct answer and the training data C2 of incorrect answer by the linear SVM. The results of the learning are recorded as the separating hyperplane data 31. Note that in a case of d dimensions (d>2: d is an integer), the feature quantity plane becomes a feature quantity space and the separating hyperline becomes a separating hyperplane. Therefore, the separating hyperplane is a concept including the separating hyperline, and the feature quantity space is a concept including the feature quantity plane.

Figure 14:
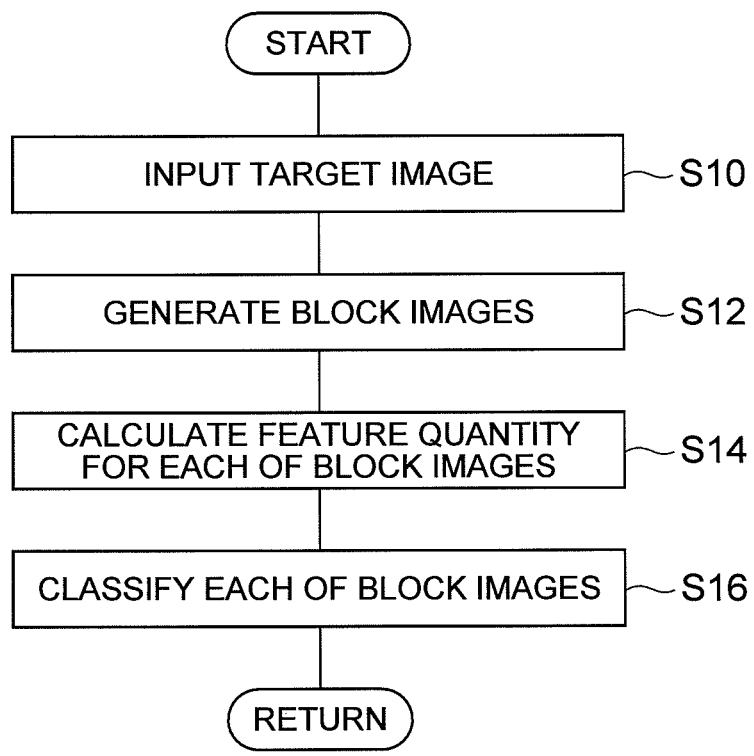
FIG. 14 is a flowchart illustrating operation of the image identification device depicted in FIG. 1.

Operation of the image identification device 1 according to the present embodiment will be described hereinafter. FIG. 14 is a flowchart illustrating identification operation of the image identification device 1 according to the present embodiment. A control process depicted in FIG. 14 is performed after the execution of the above-described learning process and at the timing when a process start button included in the mobile terminal 3 is turned on, for example.

As depicted in FIG. 14, the target image input unit 10 inputs a target image (S10: input step). When the process at S10 is completed, the flow proceeds to a block image generation process (S12: block image generation step). In the process at S12, the block image generation unit 11 divides the target image input in the process at S10 to generate block images. When the process at S12 is completed, the flow proceeds to a feature quantity calculation process (S14: feature quantity computing step). In the process at S14, the feature quantity computing unit 12 calculates a feature quantity for each of the block images generated in the process at S12. For example, the feature quantity computing unit 12 calculates feature quantities depicted in FIG. 4 for each of the block images. When the process at S14 is completed, the flow proceeds to a classification process (S16: category determination step). In the process at S16, the category determination unit 13 compares the feature quantities calculated in the process at S16 for each of the block images with the already-learned separating hyperplane data 31 and, with respect to block images having feature quantities of larger magnitudes than a separating hyperplane for a predetermined category, determines that these block images belong to the category. When categories are determined for all block images, the control process depicted in FIG. 14 ends.

An image identification program for causing the mobile terminal 3 (computer) to function as the image identification device 1 will be described hereinafter.

The image identification program includes a main module, input module, and a computation processing module. The main module is a unit that controls image processing in a centralized manner. The input module causes the mobile terminal 3 to operate so as to acquire an input image. The computation processing module includes a block image dividing module, a feature quantity computing module, and a category determination module. Functions implemented by operating the main module, the input module, and the computation processing module are the same as the functions of the target image input unit 10, the block image generation unit 11, the feature quantity computing unit 12, and the category determination unit 13 of the image identification device 1 described above.

The image identification program is provided by a storage medium such as a ROM or a semiconductor memory. Alternatively, the image identification program may be provided as a data signal via a network.

The image identification device 1 according to the present embodiment described above uses, as a feature quantity of the target block image B0, not only a local feature quantity calculated according to image information of the target block image B0 but also a global feature quantity calculated according to image information of the target image G1 as a whole, and thus can classify the target block image B0 considering not only information of the target block image B0 itself but also a relationship between the target block image B0 and the target image G1. Accordingly, even when it is impossible to determine the category only according to the target block image B0, looking at the target image G1 as a whole makes it possible to determine the category of the target block image B0. For example, when the target block image B0 is blue, it is difficult to determine whether the category is "sky" or "sea" according to image information of the target block image B0. However, if a feature quantity for determining whether it is "sky" or "sea" can be acquired in a global feature quantity, it becomes possible to determine the category of the target block image B0. Therefore, it is possible to improve classification accuracy of the block image B0.

In addition, with the image identification device 1 according to the present embodiment, since the feature quantity computing unit 12 uses, as the global feature quantity, a feature quantity calculated according to image information of the four corner areas R6 to R9 in the target image G1 having a rectangular shape, a feature that emerges when a circular matter is a subject can be made included in the feature quantity of the target block image B0.

In addition, with the image identification device 1 according to the present embodiment, since the feature quantity computing unit 12 uses, as the feature quantity of the target block image B0, a neighbor feature quantity calculated according to image information of the neighboring block images B1 to B8 that surround the target block image B0, it is possible to classify the target block image B0 in consideration of a relationship between the block image B0 and the neighboring block images B1 to B8 existing around the block image B0.

In addition, with the image identification device 1 according to the present embodiment, since the feature quantity computing unit 12 uses, as the neighbor feature quantity, a feature quantity calculated according to image information of the target block image B0 selected from the neighboring block images B1 to B8, a symmetric degree of the neighboring block images B1 to B8 can be made included in the feature quantity of the target block image B0. Accordingly, it is possible to classify the block image B0 in further consideration of the relationship between the target block image B0 and the neighboring block images B1 to B8.

In addition, with the image identification device 1 according to the present embodiment, since the feature quantity computing unit 12 selects from the neighboring block images B1 to B8 neighboring block images existing symmetrically with respect to the target block image B0, not only are feature quantities of neighboring blocks B1 to B8 each calculated individually used, but also a feature quantity of block sets according to its symmetric degree can be calculated, thereby it is possible to classify a subject having a symmetric shape in a direction side-to-side, up-and-down, or the like and a background. For example, classification of a person, a person's face, and the like becomes possible.

In addition, with the image identification device 1 according to the present embodiment, since the feature quantity computing unit 12 uses, as the feature quantity of the target block image B0, a sub-global feature quantity calculated according to image information of the partial areas R2 to R4 being a partial area comprising a plurality of block images, each partial area including the target block image B0, it is possible to classify the block image in consideration of the relationship between the target block image B0 and the block images existing around the target block image B0.

In addition, with the image identification device 1 according to the present embodiment, since the feature quantity computing unit 12 uses, as the sub-global feature quantity, a feature quantity calculated according to image information of the partial area R3 comprising a vertical array of block images including the target block image B0, and a feature quantity calculated according to image information of the partial area R4 comprising a horizontal array of block images including the target block image B0, it is possible to classify the block images so as to appropriately identify a subject, background, and the like having a feature in the horizontal direction or the vertical direction.

Note that the above-described embodiment represents one example of the image identification device, the image identification method, the image identification program, and the recording medium according to the present invention, and are not limited to the device, the method, the program, and the recording medium according to the embodiment, and also may be modified or applied to other embodiments.

For example, in the above-described embodiment, cases in which the global feature quantity, the neighbor feature quantity, and the sub-global feature quantity in addition to the local feature quantity are used as feature quantities of an image have been described, but even when at least one feature quantity selected from the global feature quantity, the neighbor feature quantity, and the sub-global feature quantity in addition to the local feature quantity is used, it is possible to improve classification accuracy of block images obtained by dividing a target image.

What is claimed is:

1. An image identification device that learns in advance a separating plane used for classifying images into predetermined categories in a feature quantity space using a feature of the image as a coordinate axis and uses the separating plane to classify block images obtained by dividing a target image into the categories, the image identification device comprising:
   an input unit that inputs the target image;
   a block image generation unit that divides the target image into a plurality of blocks to generate the block images;
   a feature quantity computing unit that computes feature quantities of the block images; and
   a category determination unit that determines whether the block images are classified into one of the categories or not, using the separating plane and coordinate positions corresponding to magnitudes of feature quantities of the block images in the feature quantity space,
   wherein
   the feature quantity computing unit uses, as a feature quantity of a given target block image in the block images, local feature quantities calculated according to image information of the target block image and a global feature quantity calculated according to image information of the target image.

2. The image identification device according to claim 1, wherein the feature quantity computing unit uses, as the global feature quantity, a feature quantity calculated according to image information of four corner areas in the target image.

3. The image identification device according to claim 1, wherein the feature quantity computing unit uses, as the feature quantity of the target block image, a neighbor feature quantity calculated according to image information of neighboring block images that are block images surrounding the target block image.

4. The image identification device according to claim 2, wherein the feature quantity computing unit uses, as the feature quantity of the target block image, a neighbor feature quantity calculated according to image information of neighboring block images that are block images surrounding the target block image.

5. The image identification device according to claim 3, wherein the feature quantity computing unit uses, as the neighbor feature quantity, a feature quantity calculated according to image information of block image selected from the neighboring block images.

6. The image identification device according to claim 4, wherein the feature quantity computing unit uses, as the neighbor feature quantity, a feature quantity calculated according to image information of block image selected from the neighboring block images.

7. The image identification device according to claim 5, wherein the feature quantity computing unit selects, among the neighboring block images of the target block image, ones existing symmetrically with respect to the target block image.

8. The image identification device according to claim 6, wherein the feature quantity computing unit selects, among the neighboring block images of the target block image, ones existing symmetrically with respect to the target block image.

9. The image identification device according to claim 1, wherein the feature quantity computing unit uses, as the feature quantity of the target block image, a sub-global feature quantity calculated according to image information of a partial area comprising a plurality of the block images including the target block image.

10. The image identification device according to claim 9, wherein the feature quantity computing unit uses, as the sub-global feature quantity, a feature quantity calculated according to image information of a horizontal long partial area comprising the block images including the target block image, and a feature quantity calculated according to image information of a vertical long partial area comprising the block images including the target block image.

11. An image identification method for learning in advance a separating plane used for classifying images into predetermined categories in a feature quantity space using a feature of the image as a coordinate axis and then using the separating plane to classify block images obtained by dividing a target image into the categories, the image identification method comprising:
   an input step of inputting the target image;
   a block image generation step of dividing the target image into a plurality of blocks to generate the block images;
   a feature quantity computing step of computing feature quantities of the block images; and
   a category determination step of determining whether the block images are classified into one of the categories or not, using the separating plane and coordinate positions corresponding to magnitudes of feature quantities of the block images in the feature quantity space,
   wherein
   at the feature quantity computing step,
   as a feature quantity of a given target block image in the block images, local feature quantities calculated according to image information of the target block image and a global feature quantity calculated according to image information of the target image are used.

12. A non-transitory computer-readable recording medium in which an image identification program is stored that causes a computer to operate so as to learn in advance a separating plane used for classifying images into predetermined categories in a feature quantity space using a feature of the image as a coordinate axis and use the separating plane to classify block images obtained by dividing a target image into the categories, the recording medium storing therein an image identification program that causes the computer to operate as: an input unit that inputs the target image; a block image generation unit that divides the target image into a plurality of blocks to generate the block images; a feature quantity computing unit that computes feature quantities of the block images, wherein the feature quantity computing unit uses, as a feature quantity of a given target block image in the block images, local feature quantities calculated according to image information of the target block image and a global feature quantity calculated according to image information of the target image; and a category determination unit that determines whether the target block image is classified into one of the categories or not, using the separating plane and coordinate positions corresponding to magnitudes of feature quantities of the target block image in the feature quantity space.

* * * * *